US012598250B2

(12) United States Patent
Guan et al.

(10) Patent No.: US 12,598,250 B2
(45) Date of Patent: Apr. 7, 2026

(54) SYSTEMS AND METHODS FOR COHERENT AND TIERED VOICE ENROLLMENT

(71) Applicant: Capital One Services, LLC, McLean, VA (US)

(72) Inventors: Zhiyuan Guan, McLean, VA (US); Boqing Xu, Rolling Meadows, IL (US); Michael Quirolo, Arlington, VA (US); Sarah Strauss, Ashburn, VA (US); John Bartusek, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 507 days.

(21) Appl. No.: 17/648,548

(22) Filed: Jan. 21, 2022

(65) Prior Publication Data

US 2023/0239290 A1     Jul. 27, 2023

(51) Int. Cl.
| | |
|---|---|
| *H04M 3/22* | (2006.01) |
| *G06F 21/32* | (2013.01) |
| *G10L 17/04* | (2013.01) |
| *G10L 17/06* | (2013.01) |
| *H04L 9/40* | (2022.01) |

(52) U.S. Cl.
CPC .......... *H04M 3/2236* (2013.01); *G06F 21/32* (2013.01); *G10L 17/04* (2013.01); *G10L 17/06* (2013.01); *H04L 63/0861* (2013.01); *H04L 63/102* (2013.01); *H04L 63/105* (2013.01); *H04M 2201/405* (2013.01); *H04M 2201/41* (2013.01); *H04M 2203/6054* (2013.01)

(58) Field of Classification Search
CPC ......... G10L 17/00; G10L 17/04; G10L 17/06; H04L 63/00; H04L 63/102; H04L 63/105; H04L 63/0861; H04M 3/00; H04M 3/2236; H04M 2201/00; H04M 2201/41; H04M 2201/405; H04M 2203/00; H04M 2203/6054; G06F 21/00; G06F 21/32
See application file for complete search history.

(56) References Cited

U.S. PATENT DOCUMENTS

| | | | |
|---|---|---|---|
| 7,054,811 | B2 | 5/2006 | Barzilay |
| 8,751,801 | B2 | 6/2014 | Harris et al. |
| 2003/0046083 | A1 | 3/2003 | Devinney, Jr. et al. |

(Continued)

*Primary Examiner* — Sean E Serraguard

(74) *Attorney, Agent, or Firm* — Bookoff McAndrews, PLLC

(57) ABSTRACT

Computer-implemented methods and systems include enrolling a user at a first security tier, from a plurality of security tiers, based on user risk criteria and call risk criteria applied to one or more historical calls, storing voice calibration information for the enrolled user based on the one or more historical calls, monitoring for a call and receiving data associated with the call, the data having a voice component captured using a microphone, authenticating the call as originating from the enrolled user by matching the voice component to the voice calibration information, granting the enrolled user account access in accordance with the first security tier, during the call, based on the enrolling the user at the first security tier and the authenticating the call as originating from the enrolled user, and updating the voice calibration information based on the voice component.

20 Claims, 9 Drawing Sheets

(56)　　　　　References Cited

U.S. PATENT DOCUMENTS

| 2010/0319063 | A1* | 12/2010 | Koppolu | H04L 65/1104 |
| | | | | 709/227 |
| 2014/0196129 | A1* | 7/2014 | Amin | H04L 63/08 |
| | | | | 726/6 |
| 2016/0308855 | A1* | 10/2016 | Lacey | H04L 63/061 |
| 2018/0005630 | A1* | 1/2018 | May | G07G 1/01 |
| 2020/0366671 | A1* | 11/2020 | Larson | H04L 9/3231 |
| 2020/0411013 | A1* | 12/2020 | Horton | H04M 3/2281 |
| 2021/0037000 | A1* | 2/2021 | Attard | G06N 20/00 |
| 2021/0326421 | A1* | 10/2021 | Khoury | G10L 17/08 |
| 2022/0165275 | A1* | 5/2022 | Gupta | G06F 21/32 |

* cited by examiner

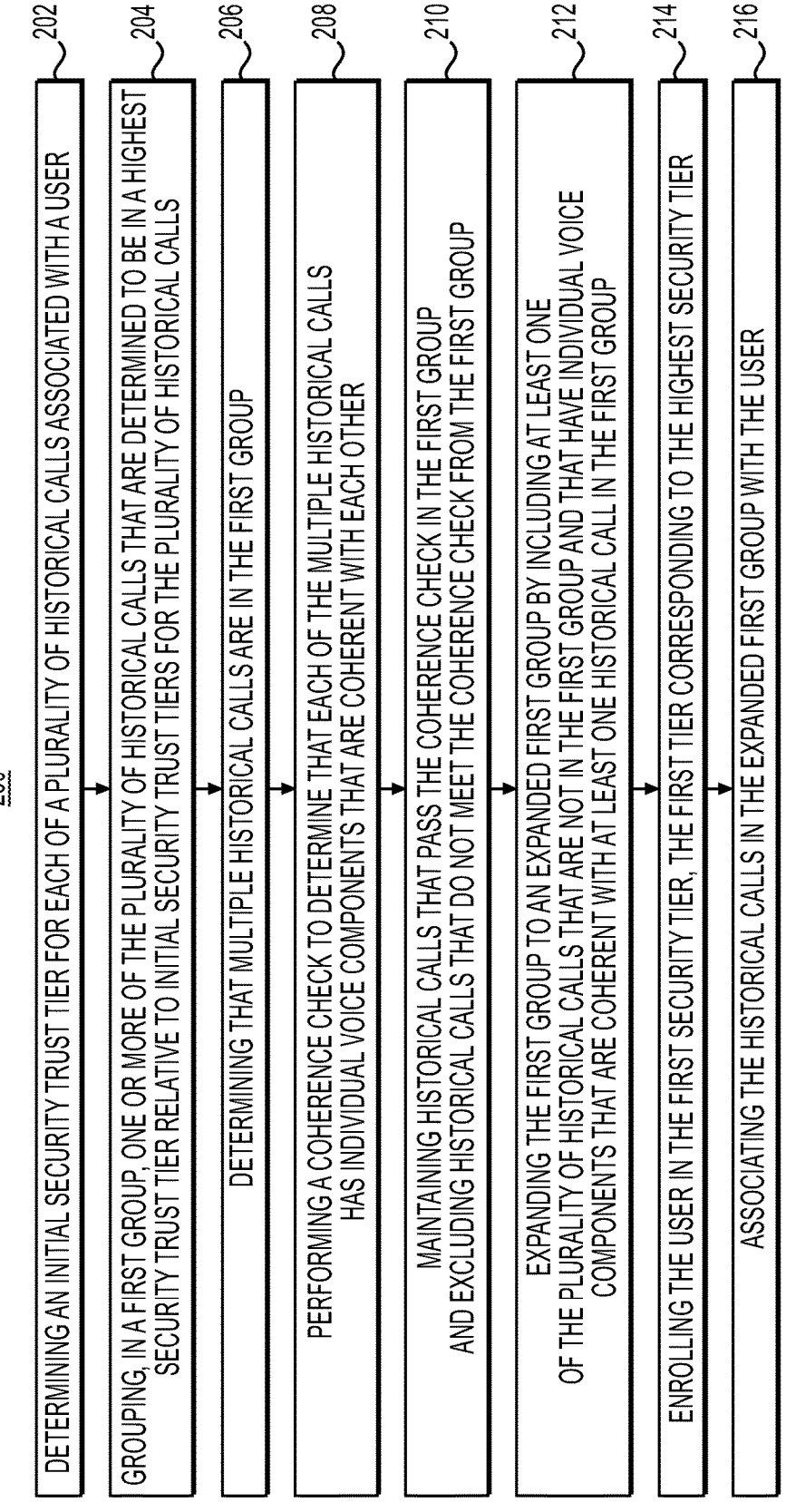

200

202 — DETERMINING AN INITIAL SECURITY TRUST TIER FOR EACH OF A PLURALITY OF HISTORICAL CALLS ASSOCIATED WITH A USER

204 — GROUPING, IN A FIRST GROUP, ONE OR MORE OF THE PLURALITY OF HISTORICAL CALLS THAT ARE DETERMINED TO BE IN A HIGHEST SECURITY TRUST TIER RELATIVE TO INITIAL SECURITY TRUST TIERS FOR THE PLURALITY OF HISTORICAL CALLS

206 — DETERMINING THAT MULTIPLE HISTORICAL CALLS ARE IN THE FIRST GROUP

208 — PERFORMING A COHERENCE CHECK TO DETERMINE THAT EACH OF THE MULTIPLE HISTORICAL CALLS HAS INDIVIDUAL VOICE COMPONENTS THAT ARE COHERENT WITH EACH OTHER

210 — MAINTAINING HISTORICAL CALLS THAT PASS THE COHERENCE CHECK IN THE FIRST GROUP AND EXCLUDING HISTORICAL CALLS THAT DO NOT MEET THE COHERENCE CHECK FROM THE FIRST GROUP

212 — EXPANDING THE FIRST GROUP TO AN EXPANDED FIRST GROUP BY INCLUDING AT LEAST ONE OF THE PLURALITY OF HISTORICAL CALLS THAT ARE NOT IN THE FIRST GROUP AND THAT HAVE INDIVIDUAL VOICE COMPONENTS THAT ARE COHERENT WITH AT LEAST ONE HISTORICAL CALL IN THE FIRST GROUP

214 — ENROLLING THE USER IN THE FIRST SECURITY TIER, THE FIRST TIER CORRESPONDING TO THE HIGHEST SECURITY TIER

216 — ASSOCIATING THE HISTORICAL CALLS IN THE EXPANDED FIRST GROUP WITH THE USER

FIG. 2

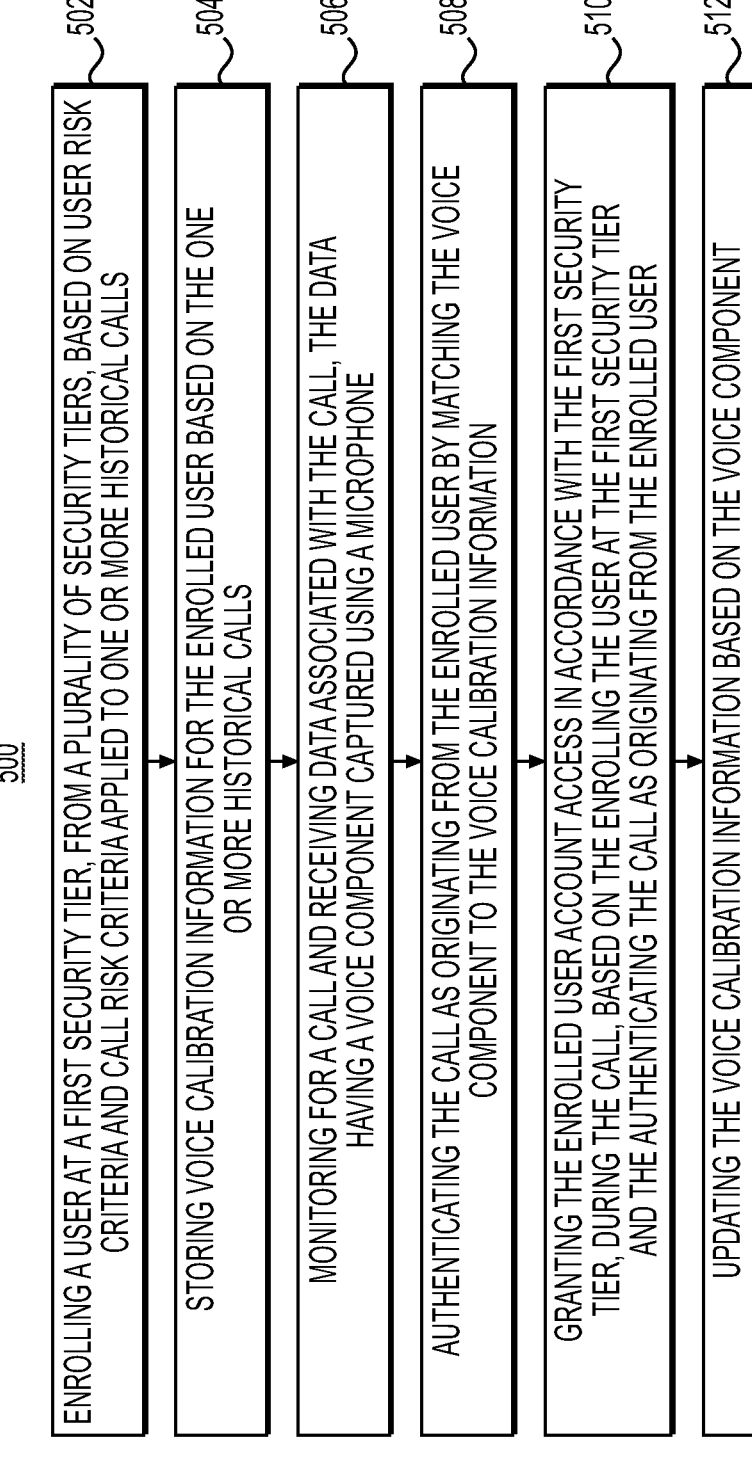

ENROLLING A USER AT A FIRST SECURITY TIER, FROM A PLURALITY OF SECURITY TIERS, BASED ON USER RISK CRITERIA AND CALL RISK CRITERIA APPLIED TO ONE OR MORE HISTORICAL CALLS — 502

STORING VOICE CALIBRATION INFORMATION FOR THE ENROLLED USER BASED ON THE ONE OR MORE HISTORICAL CALLS — 504

MONITORING FOR A CALL AND RECEIVING DATA ASSOCIATED WITH THE CALL, THE DATA HAVING A VOICE COMPONENT CAPTURED USING A MICROPHONE — 506

AUTHENTICATING THE CALL AS ORIGINATING FROM THE ENROLLED USER BY MATCHING THE VOICE COMPONENT TO THE VOICE CALIBRATION INFORMATION — 508

GRANTING THE ENROLLED USER ACCOUNT ACCESS IN ACCORDANCE WITH THE FIRST SECURITY TIER, DURING THE CALL, BASED ON THE ENROLLING THE USER AT THE FIRST SECURITY TIER AND THE AUTHENTICATING THE CALL AS ORIGINATING FROM THE ENROLLED USER — 510

UPDATING THE VOICE CALIBRATION INFORMATION BASED ON THE VOICE COMPONENT — 512

SYSTEMS AND METHODS FOR COHERENT AND TIERED VOICE ENROLLMENT

TECHNICAL FIELD

Various embodiments of the present disclosure relate generally to voice enrollment, and more particularly, systems and methods for assigning security trust tiers based on voice enrollment.

BACKGROUND

Speaker recognition (e.g., using voice biometrics) is generally used in call centers to determine if an incoming caller is who the caller claims to be. Such a recognition may compare the voice of the caller to a voice on file that corresponds to the caller's claimed identity. The voice on file is typically obtained by active or passive enrollment from a previous recording. Typically there is no way to know if the recording was made by the actual account owner claiming to be the account owner or if the account has multiple owners. Additionally, multiple callers may call in for the same account, which may reduce the confidence in the voice recording(s) associated with the account.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for voice verification based on security tier designation based on enrolling a user at a first security tier, from a plurality of security tiers, based on user risk criteria and call risk criteria applied to one or more historical calls; storing voice calibration information for the enrolled user based on the one or more historical calls; monitoring for a call and receiving data associated with the call, the data having a voice component captured using a microphone; authenticating the call as originating from the enrolled user by matching the voice component to the voice calibration information; granting the enrolled user account access in accordance with the first security tier, during the call, based on the enrolling the user at the first security tier and the authenticating the call as originating from the enrolled user; and updating the voice calibration information based on the voice component.

According to certain aspects of the disclosure, methods and systems are disclosed for enrolling a user in a security tier designation based on determining an initial security trust tier for each of a plurality of historical calls associated with a user; grouping, in a first group, one or more of the plurality of historical calls that are determined to be in a highest security trust tier relative to initial security trust tiers for the plurality of historical calls; determining that multiple historical calls are in the first group; performing a coherence check to determine that each of the multiple historical calls has individual voice components that are coherent with each other; maintaining historical calls that pass the coherence check in the first group and excluding historical calls that do not pass the coherence check from the first group; expanding the first group to an expanded first group by including at least one of the plurality of historical calls that are not in the first group and that have individual voice components that are coherent with at least one historical call in the first group; enrolling the user in the first security tier, the first tier corresponding to the highest security trust tier; and associating the historical calls in the expanded first group with the user.

In another aspect, a system includes a data storage device storing processor-readable instructions and a processor operatively connected to the data storage device and configured to execute the instructions to perform operations that include determining an initial security trust tier for each of one or more historical calls, the one or more historical calls being associated with a user; grouping, in a first group, one or more of the historical calls that are determined to be in a highest security trust tier relative to each of the one or more initial security trust tiers for each of the historical calls; determining that multiple historical calls are in the first group; performing a coherence check to determine that each of the multiple historical calls have individual voice components that are coherent with each other; maintaining historical calls that pass the coherence check in the first group and excluding historical calls that do not pass the coherence check from the first group; expanding the first group to an expanded first group by including at least one of the historical calls that are not in the first group and that have individual voice components that are coherent with at least one historical call in the first group; associating the one or more historical calls in the expanded first group with the user; enrolling the user at a first security tier, from a plurality of security tiers, based on user risk criteria and call risk criteria applied to one or more historical calls, the first security tier corresponding to the highest security trust tier; storing voice calibration information for the enrolled user based on the one or more historical calls; monitoring for a call and receiving data associated with the call, the data having a voice component captured using a microphone; authenticating the call as originating from the enrolled user by matching the voice component to the voice calibration information; granting the enrolled user account access in accordance with the first security tier, during the call, based on the enrolling the user at the first security tier and the authenticating the call as originating from the enrolled user; and updating the voice calibration information based on the voice component.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart for enrolling a user in a given security trust tier, according to one or more embodiments.

FIG. 5 depicts a flowchart for granting access in accordance with a security trust tier, according to one or more embodiments.

Like reference numbers and designations in the various drawings indicate like elements.

DETAILED DESCRIPTION OF EMBODIMENTS

Figure 1:
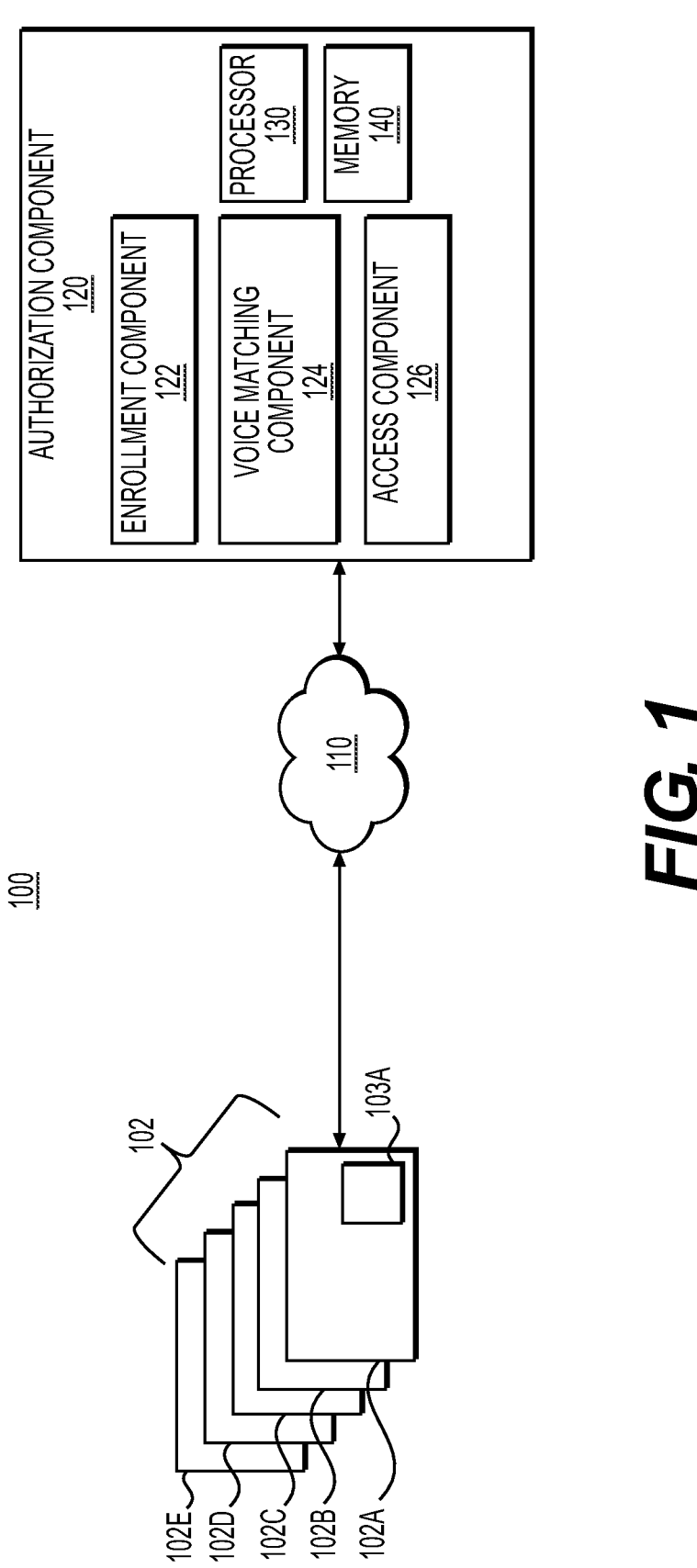
FIG. 1 depicts an exemplary enrollment and security trust tier environment, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, "upstream data" may be data received from one or a plurality of sources that generate, modify, or obtain data. An upstream data source may be a data source that collects or generates data based on user account information, user behavior information, user action information, user status, user changes, system status, system profiles, system actions, or the like. As an example, an upstream data source may include data about whether one or more users have activated a given user device having one or more device features (e.g., location services) that enable the respective user device to perform a task (e.g., identify their location). As another example, an upstream data source may include data about whether or not each of a plurality of users has activated a feature (e.g., enroll in email notifications) using each of their user profiles. Upstream data sources may provide data related to any number of users (e.g., millions of users). The upstream data may be organized based at least on a type of at least a subset of the upstream data. For example, organized upstream data may associate a plurality of data points with a corresponding user such that a plurality of different upstream data sources may have data about a given user and may identify that data as being associated with that given user (e.g., a first upstream data source may have device information about a first user and a second upstream data source may have enrollment data about the same first user).

Implementations of the disclosed subject matter include enrolling a user in a security trust tier based on one or more historical calls. A security trust tier may determine the amount of access that the user is granted when the user's voice is authenticated. For example, a first user may be enrolled in a high security trust tier and a second user may be enrolled in a low security trust tier. Upon being enrolled in a security trust tier, the user may initiate a voice based call. Upon verification that the user's voice is authentic, the user may be granted access in accordance with the security trust tier. For example, upon verification that the first user initiated a call, the first user may be granted greater access based on the first user's higher security trust tier. Similarly, upon verification that the second user initiated a call, the second user may be granted lesser access than the first user, based on the second user's lower security trust tier.

As applied herein, a higher security trust tier corresponds to a more stringent security trust tier with higher access and a low security trust tier corresponds to a less stringent security trust tier. However, it will be understood that any security trust tier designation that differentiates between two or more relative security trust tiers may be applied. For example, numerical tiers, classifications, or the like may be used as security trust tiers that have varying levels of access relative to each other.

Techniques and systems disclosed herein prevent or mitigate the need for a user to provide conventional authentication if a call placed by the user meets a security trust tier. For example, a high security trust tier may conventionally require a user to provide two-factor authentication (e.g., pin code, text message verification, hyperlink selection, etc.) prior to be granted access associated with the high security trust tier. However, techniques and systems disclosed herein can be used to prevent or mitigate the need for such conventional authentication based on voice authentication that replaces the conventional authentication.

Techniques and systems disclosed herein may be implemented using a system including a computer server, database storage, electronic device or set of devices to generate upstream data, provide upstream data, gather upstream data from one or more upstream data sources, apply rules, identify a tagged population, and/or execute a downstream task. The techniques and systems allow use of quality data in identifying the tagged population such that the downstream execution is applied to the proper population and that users are not included when they should not be and users are not excluded when they should not be. Accordingly, the techniques and systems provided herein enable an improvement to the downstream execution technology by executing downstream tasks for the correct population and by more efficiently using system resources such that resources are not expended on the incorrect population. By providing individual rule-based monitoring and improvement, rules may be properly adjusted and invalid upstream data may be correctly flagged and corrected.

FIG. 1 depicts an exemplary computing environment 100 for security trust tier based enrolment and access. As shown, one or more users 102 (e.g., in this embodiment users 102A, 102B, 102C, 102D, 102E) may interact with an authorization component 120 via a network 110. Users 102 may each have one or more microphones (e.g., microphone 103A for user 102A) that may be configured to capture each respective user's voice and transmit such voice to authorization component 120 via network 110. It will be understood that each of the users 102 may have multiple devices with one or more microphones and that some users 102 may have the same devices as each other (e.g., a family using a house telephone).

The microphones (e.g., microphone 103A) may be independent or may be part of an electronic device. An electronic device may include, but is not limited to, a telephone, a mobile phone, a laptop, a computer, a wearable device (e.g., a watch, glasses, clothing, etc.), headphones, earphones, television, audio system, speaker, or the like. A microphone may be a cardioid, super cardioid, omni, figure 8, or any other suitable type of microphone. A microphone may convert received sound into an electrical current. Sound waves from a user's voice may be incident on a diaphragm that vibrates. The vibration may move a magnet near a coil or the coil may move within a magnet. Alternatively, or in addition, a microphone may use capacitance to operate. Microphones including capacitors may include parallel conducting plates that store charge and are used to smooth out signals like voltage variations in a power supply. A user's incoming voice may vibrate a plate of a capacitor. The varying capacitance may be converted into a corresponding electrical signal. The electronic signal may be processed (e.g., via a processor).

A processed or unprocessed voice signal may be transmitted to an authorization component 120 via network 110. The processed or unprocessed voice signal may be transmitted based on an initiated communication between a user 102 and the authorization component 120. The initiation may be by a user 102, an entity associated with authorization component 120, or by authorization component 120. The authorization component may be associated with an entity (e.g., an entity that provides a service to users 102).

Users 102 (e.g., processors, transvers, cellular components, etc. associated with user electronic devices) may connect to network 110. Network 110 may be any suitable network or combination of networks and may support any appropriate protocol suitable for the communication of data between various components in environment 100. Network 110 may include a telephone network, cellular network, public network (e.g., the Internet), a private network (e.g., a network within an organization), or a combination of public and/or private networks.

According to an exemplary implementation, authorization component 120 may be associated with multiple entities and may independently facilitate authorization services for each of the multiple entities. An authorization component associated with multiple entities may silo information associated with each entity such that information (e.g., voice data, security trust tiers, enrollment information, etc.) associated with a first entity is not shared or overlapped with information associated with a second entity.

Authorization component 120 may include an enrollment component 122. The enrollment component 122 may be configured to enroll users 102 into respective security trust tiers. The enrollment may be based on historical calls with each respective user 102. Enrollment into a security trust tier may be based on user risk criteria and/or call risk criteria associated with each respective user, as further discussed herein. The user risk criteria and/or call risk criteria may be independent of a given call (e.g., a call initiated by a user). For example, user risk criteria may be based on a user's profile and/or historical calls and, accordingly, may be independent of a new given call.

Authorization component 120 may include a processor 130 and a memory 140. Memory 140 may include voice calibration information based on one or more historical calls by a given user. The voice calibration information may include actual voice recordings, metadata or other data associated with the voice of a user based on historical calls (e.g., signal properties), or the like. Enrollment component 122 may be in communication with memory 140 and may store and/or retrieve voice calibration information to/from memory 140.

Authorization component 120 may include a voice matching component 124 configured to match two or more voice components (e.g., voice calibration information). Voice matching component 124 may receive two or more voice components (e.g., voice calibration information) and may output whether or not the two or more or a subset of the two or more voice components match. The output may be a binary result (e.g., match or no match) or may be a match score based on a degree of match (e.g., based on signal analysis).

Authorization component 120 may include an access component 126. Access component 126 may facilitate access to a user based on the user's security trust tier, as determined by enrollment component 122. Access component 126 may determine if an access request by a user is allowed based on a user's security trust tier and may facilitate access to the access request if allowed. For example, access component 126 may facilitate providing information related to an access request (e.g., to a call center representative, an online portal, etc.) based on an access request meeting a security trust tier. The access component 126 may deny an access request if a user's security trust tier does not meet the access request.

As applied herein a security trust tier may be a designation, classification, value, or the like that identifies a security level (e.g., access level, permissions, etc.) for a given user. A security trust tier may be a numerical value, a category, or the like. For example, a security trust tier may be between a 0 and a 5. As another example, security trust tiers may include high, medium, and low tiers. Security trust tiers may be relative to each other. For example, a given security trust tier may be higher or lower than a different security trust tier.

As applied herein, a historical call may be any call, voice communication, communication with a voice component, or the like that occurs prior to a current time. A historical call may be a call that includes one or more voice components. According to implementations of the disclosed subject matter, a historical call may meet minimum criteria in order to be designated a historical call for use, as disclosed herein. The minimum criteria may include the call being of adequate voice quality, the call having a limited number of callers or users, the call being from a trusted device, or the like or a combination thereof.

As applied herein, a voice component may be a voice call, a voice component of a call, a portion of a voice call, a portion of a voice component of a call, or the like. The voice component, a call, or voice calibration information may be in any applicable compressed or uncompressed file format such as a wave audio file (WAV), audio interchange file format (AIFF), AU, raw header-less pulse code modulation (PCM), monkey's audio, WavPack, TrueAudio (TTA), adaptive transform acoustic coding (ATRAC), apple lossless audio codec (ALAC), MPEG-4 scalable to lossless MPEG-4 audio lossless coding, windows media audio (WMA), opus, MP3, vorbis, musepack, advanced audio coding (AAC), adaptive transform acoustic coding (ATRAC), or the like.

As applied herein, voice calibration information may be information that identifies an audio component as being associated with a user. Voice calibration information may include an audio file, signals associated with an audio file or call, metadata or other data of an audio file or call, voice signatures, and/or any other component that helps identify a user or helps compare one voice component to another voice component.

As applied herein, a coherence check may determine if one or more calls from a group of calls includes a voice component from a given user associated with the group of calls. For example, if a group of calls include four calls including a first user's voice and a single call from a second user's voice, the coherence check may eliminate the single call from the group of calls such that the remaining calls in the group of calls are from the first user.

As applied herein, enrolling a user in a security trust tier includes assigning a given security trust tier to the user. The enrollment may include coding a security trust tier value or pointer to the user's file such that when an access request is triggered (e.g., based on the user requesting an action on a current call), the access component 126 compares the access request to the security trust tier value or pointer to determine if the access request is granted or denied. A security trust tier may be associated with a user's profile. A security trust tier may change from time to time based on the one or more calls (e.g., if an initial security trust tier for a given incoming call falls below a previously higher security trust tier associated with the user and/or if the enrolled calls no longer satisfy the criteria for a given tier).

Figure 3A:
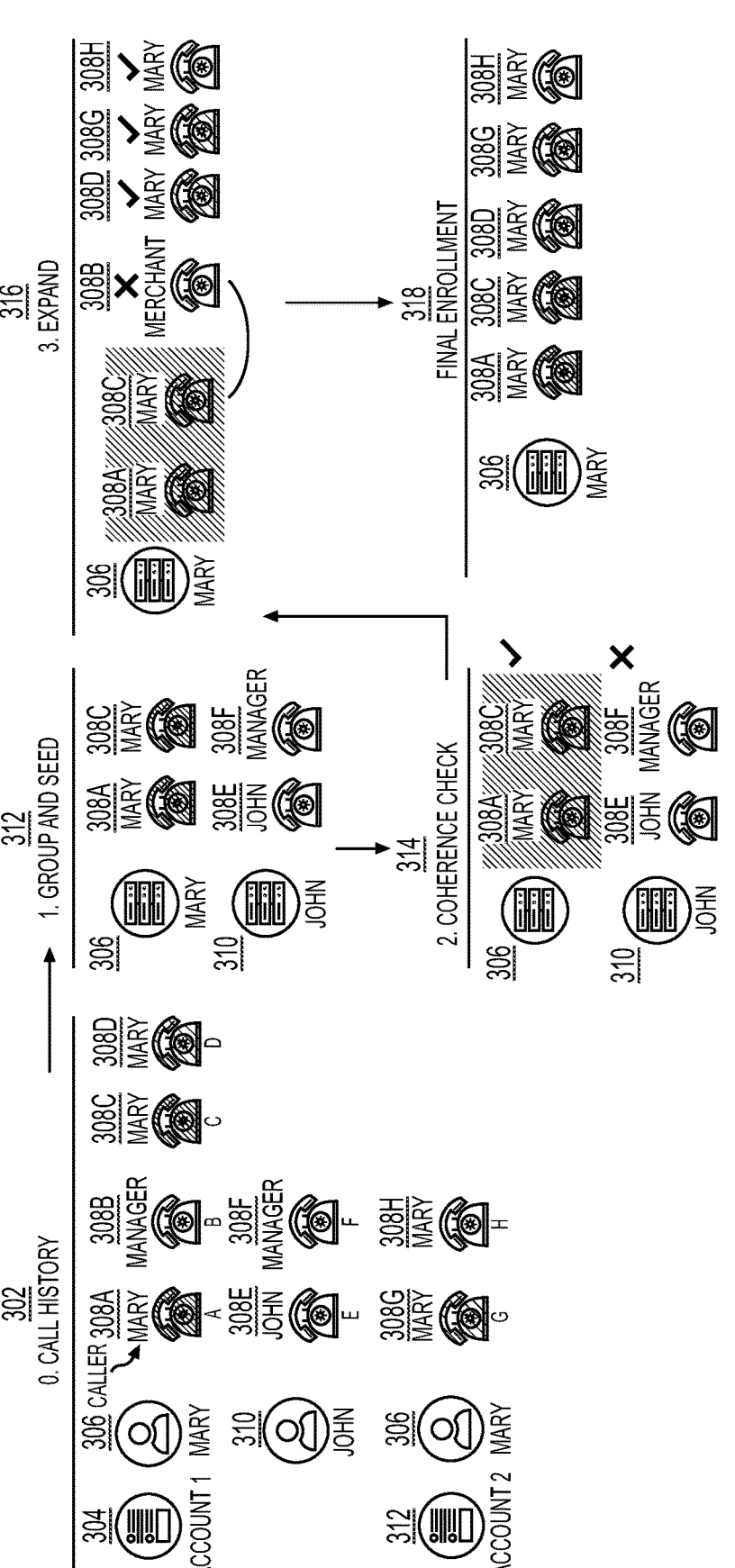
FIG. 3A depicts an exemplary diagram for enrolling a user in a security trust tier, according to one or more embodiments.
Figure 3B:
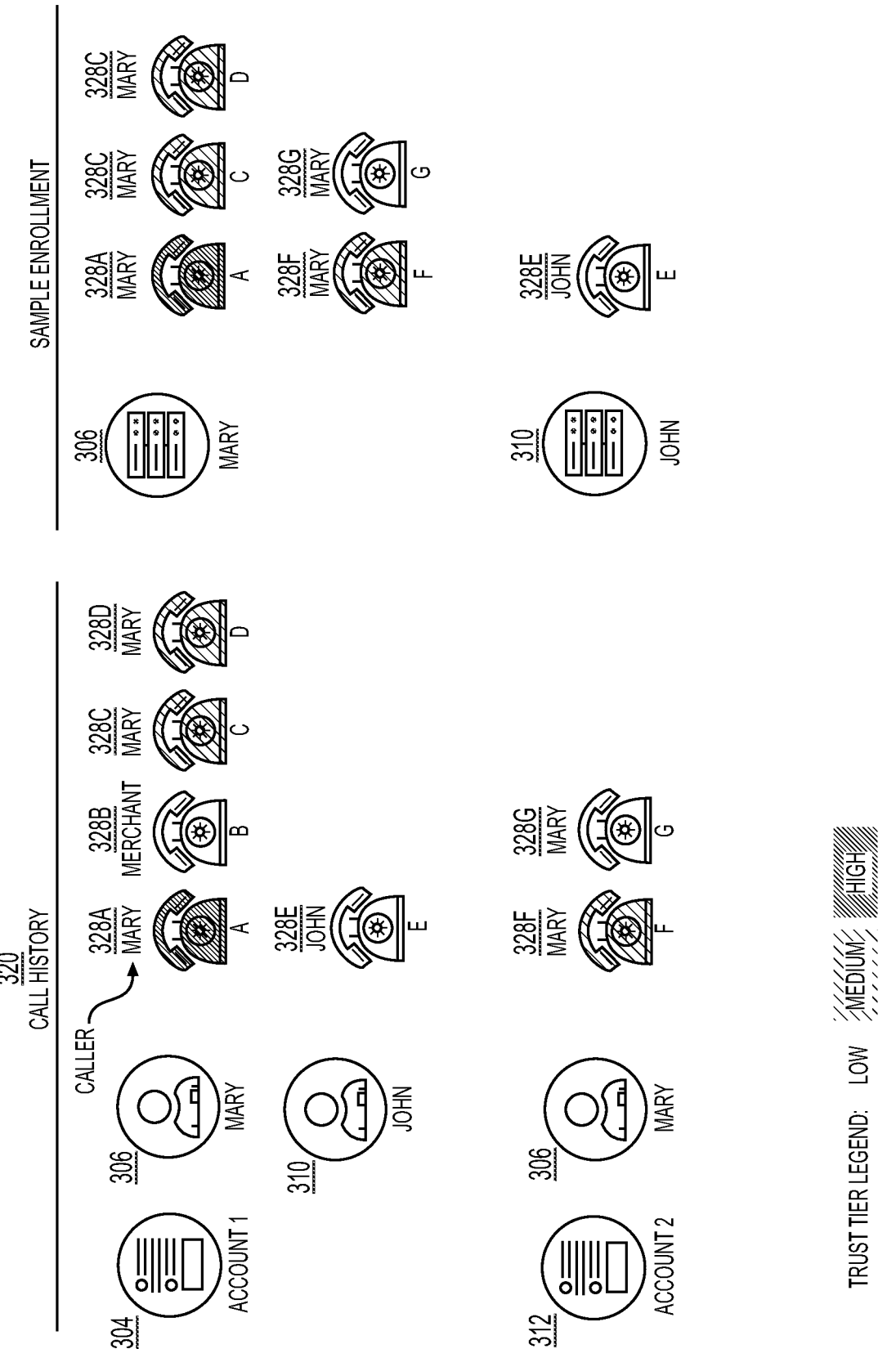
FIG. 3B depicts another exemplary diagram for enrolling a user in a security trust tier, according to one or more embodiments.

FIG. 2 depicts a flowchart 200 for enrolling a user in a given security trust tier. FIG. 3A and FIG. 3B depict exemplary diagrams for enrolling a user in a security trust tier. Flowchart 200 of FIG. 2 is disclosed herein with examples from FIGS. 3A and 3B for explanation purposes only. It will be understood that the techniques disclosed herein may be implemented in manners similar to or different from the examples provided in FIGS. 3A and 3B.

At 202 of FIG. 2, an initial security trust tier for each of a plurality of historical calls associated with a user may be determined. The initial security trust tier may be determined when each of the historical calls is received or analyzed by the authorization component 120 of FIG. 1. The initial security trust tier may designate each historical call in a security trust tier category based on one or more user risk criteria and call risk criteria. The user risk criteria and call risk criteria may be used to determine the level of risk associated with a given user and/or call. Based on its level of risk, each historical call may be assigned an initial security trust tier.

The user risk criteria and call risk criteria may be determined by enrollment component 122 of authorization component 120. Enrollment component 122 may extract user information from a user profile or based on user data. Enrollment component 122 may apply user risk criteria against the user information to generate a user risk score based on the user risk criteria. The user risk score may be, for example, a numerical value. The user risk score may be weighted heavier based on certain risk criteria than other risk criteria. For example, fraud based risk criteria may affect the user risk score more than account restriction based risk criteria and/or risk criteria related to recent transactions may affect the user risk score more than account metadata such as the credit limit.

Enrollment component 122 may extract call information based on one or more signals received from a call and/or one or more signals selected by the enrollment component. The one or more signals received from a call may include, for example, packets with information about the call. For example, a signal associated with a call may include device information (e.g., in one or more packets, headers, etc.).

Alternatively or in addition, enrollment component 122 may ping a server to determine a match between a call signal and a network value that should match with the call signal (e.g., to confirm that the call is from a trusted device). Enrollment component 122 may analyze the one or more signals to apply call risk criteria against the analyzed one or more call signals, to generate a call risk score. The call risk score may be, for example, a numerical value. The call risk score may be weighted heavier based on certain call risk criteria than other call risk criteria. For example, a trusted device based call risk criteria may be weighted heavier than a audio quality.

An initial security trust tier at 202 of FIG. 2 may be determined based on the user risk criteria and call risk criteria by, for example, applying the user risk score and the call risk score. An overall risk score may be determined using the user risk score and the call risk score. The overall risk score may be used to determine a security trust tier for a given call. The security trust tier may be specific to the call as at least the call risk score is specific to each call.

FIG. 3A shows call history 302 including a first account 304 and a second account 312. The first account 304 may be associated with Mary 306 and John 310 and the second account 312 may be associated with Mary 306 (e.g., based on the content of the call). The call history 302 may include four historical calls 308A, 308B, 308C, and 308D that are associated with Mary 306 and the first account 304 and two historical calls 308E and 308F that are associated with John 310 and the first account 304. The call history 302 may include two calls 308G and 308H associated with Mary 306 and the second account 312. The calls may be associated with Mary 306 and/or John 310 based on Mary 306 and/or John 310 identifying themselves during the calls, based on information collected during the calls, or the like.

Based on respective call risk criteria and user risk criteria, each of the historical calls 308A-308H may have a respective initial security trust tier. As shown, the initial security trust tier for Mary 306's call 308A may be high, Mary 306's call 308B may be low, Mary 306's call 308C may be high, Mary 306's call 308D may be medium, John 310's call 308E may be low, John' 310s call 308F may be low, Mary 306's call 308G may be medium, and Mary 306's call 308H may be low. As disclosed herein, each of the respective calls may have an initial security risk tier based on the respective call risk criteria and user risk criteria, either of which may depend on the time, location, duration, or any other attribute of a given call and a user profile when the call is placed.

Voice components from each of the calls 308A-308H may be available (e.g., in memory 140). Information about each of the calls, such as each call's initial security trust tier may be stored with the call or in a location where it can be associated with the call. For example, a digital copy of the voice components of each of the calls may be stored in a file or file location. The security trust tier for each respective call may be stored in a header or additional file associated with the file or file location.

At 204 of FIG. 2, historical calls associated with a given user may be grouped. For example, each of Mary 306's calls 308A, 308B, 308C, 308D, 308G, and 308H may be grouped and each of John 310's calls 308E and 308F may be grouped together. Accordingly, the grouping may group calls from Mary 306's first account 304 and Mary 306's second account 312 such that the resulting group may be account agnostic and associated with an individual (e.g., Mary 306).

Further, at 204, the calls in each given group (e.g., Mary 306's group and John 310's group) may be seeded such that one or more calls with the highest security trust tier from within that group are maintained in the group. Accordingly, prior to seeding, a first group with high security trust tier calls as well as medium or low trust tier calls would only have the high security trust tier calls remaining in the group after the seeding. Additionally, prior to seeding, a second group with medium security trust tier calls as well as low security trust tier calls but no high trust tier calls would only have the medium security trust tier calls remaining in the group after the seeding. Additionally, prior to seeding, a third group with only low security trust tier calls would only each of the security trust tier calls in the group after seeding.

As shown in FIG. 3A, after grouping and seeding at 312, Mary 306's group may have the two highest security trust tier calls 308A and 308C and the other calls (i.e., 308B, 308D, 308G, and 308H) that are associated with Mary 306 may not be included in Mary 306's group at 312. As also shown, after grouping and seeding at 312, John 310's group may have the only two calls 308E and 308F that are associated with John 310 as both calls have the lowest security trust tier and no other calls are available for John 310. As a result, Mary 306 has two high security trust tier calls and John 310 has two low security trust tier calls in each of their respective groups. For clarification, if John 310 had one or more medium security trust tier calls associated with him, those one or more medium security trust tier calls would be in John 310's group after the grouping and seeding at 312. As a result of the grouping and seeding at 312, the historical calls in each respective group are the one or more calls with the highest security trust tier calls, for each respective group.

At 206, a determination may be made that there are multiple historical calls in a given group. If there are multiple historical calls in a given group, then the coherence check at 208 and 210 may be performed. If there is a single historical call in a given group, then steps 208 and 210 may be skipped. As shown in FIG. 3A, both Mary 306's group and John 310's group have two historical calls. Accordingly, the coherence check at 208 and 210 may be performed.

At 208, a coherence check may be performed to determine whether each of the multiple calls in a given group are coherent with each other. Calls that are coherent with each other may meet a coherence threshold for voice components that match with each other. For example, a first call may be coherent with a second call if a voice component has properties that are identical to or at least similar enough, above the coherence threshold, to the properties of a voice component of the second call. The coherence check may be conducted by comparing the signals or digital conversions of two or more calls. For example, the audio signal of a first call may be compared to the audio signal of a second call to determine to what degree auditory properties (e.g., pitch, pattern, frequency, phase, vocabulary, timings, etc.) of the first call match with audio properties of the second call. The degree may be converted to a score and that score may be compared to a coherence threshold to determine if a given call is coherent with another call. According to an implementation, an audio signal may be converted to a digital signal using an analog to digital converter prior to performing the coherence check.

As shown in FIG. 3A, a coherence check may be performed for the historical calls 308A and 308C associated with Mary 306. The coherence check may compare audio components of the two calls 308A and 308C placed by Mary 306 and may output that the two calls 308A and 308C placed by Mary 306 are coherent with each other. Similarly, a coherence check may be performed for the historical calls 308E and 308F associated with John 310. The coherence check may compare audio components of the two calls 308E and 308F placed by John 310 and may output that the two calls 308E and 308F associated with John 310 are not coherent with each other. The two calls 308E and 308F associated with John 310 may not be associated with each other because the voice component for call 308E may not match with the voice component from call 308F enough to meet a coherence threshold. As indicated in FIG. 3A, call 308E may be placed by John 310 (e.g., to a call center). However, call 308F may be placed by an account manager, on behalf of John 310 (e.g., to the call center). Accordingly, in this example, call 308F may be associated with John based on its call history 302 because the account manager may provide sufficient information to facilitate an action (e.g., account opening, account closing, account status indication, etc.) on behalf of John. However, upon running the coherence check at 308F, it may be determined that the voice component associated calls 308E and 308F are different.

According to an implementation, if the result of the coherence check at 208 results in no calls being coherent with each other, the enrollment process of FIG. 2 may be discontinued for the user. According to this implementation, the enrollment process of FIG. 2 may require at least two coherent calls from a given user to enroll in a security tier. According to another implementation, if additional historical calls from the user in a lower security trust tier are available to be grouped and seeded at 204, then the steps of FIG. 2 may be reinitiated using the calls in the lower security trust tier. In the example provided in FIG. 3A, because John 310's highest security trust tier calls were already in the lowest available initial security trust tier (i.e., the low security trust tier), additional calls associated with John 310 may be required to enroll John 310 in a security trust tier.

At 210 of FIG. 2, two or more historical calls that pass the coherence check (e.g., a coherence check threshold) may be maintained in the group associated with the respective user. Calls that do not meet the coherence check may be excluded from the group associated with the user. According to an implementation, if two or more sets of calls pass a coherence check (e.g., at least two calls in a first set and at least two calls in a second set, but not across the two sets), then the coherence check overall may be invalid. The coherence check may be invalid because having two or more sets may indicate that two or more voices are associated with the same user. In such a scenario, one or more remedial steps may be taken. For example, calls that are over a threshold amount of time old (e.g., age of the call) may be removed from the group of calls associated with a user. By removing such older calls, the outdated calls may be removed from the set of calls that are used for a repeated coherence check. Another remedial measure may be to remove the calls with the lowest quality of audio from the group of calls associated with a user. The quality of audio for a given call may be determined by analyzing the audio's signal to noise ratio, to identify outlier signals within the audio, or the like. In the example provided in FIG. 3A, calls 308A and 308C associated with Mary 306 may be maintained in the group associated with Mary.

At 212 of FIG. 2, a user's group may be expanded to an expanded group that includes the calls associated with the user that had lower initial security trust tiers than the calls that were grouped and seeded at 204 of FIG. 2 and at 312 of FIG. 3A. The expanded group may also include the calls that passed the coherence check at 208 and were maintained in the user's group at 210. The expanded group may not include the calls that were excluded at 210 for not passing the coherence check.

Additionally, at 212, a coherence check may be applied to the expanded group of historical calls. The coherence check may use the calls that passed the coherence check at 208 and were maintained in the user's group at 210 as a control group. The remaining calls in the expanded group (i.e., the calls that had a lower initial security trust tier than the calls that were grouped and seeded at 204) may be compared to voice components of the control group to determine if the remaining calls are coherent with the control group. Calls that pass this coherence check may be part of the final expanded group for the user as these calls are coherent with the highest security trust tier calls in the control group.

As shown in FIG. 3A, the expanded group for Mary 306 at 316 may include the two calls 308A and 308C that passed the coherence check 314. Additionally, the expanded group may include Mary 306's additional calls 308B, 308D, 308G, and 308H that had medium and low security trust tiers. The two calls 308A and 308C may be part of Mary 306's control group. Voice components of the additional calls 308B, 308D, 308G, and 308H may be compared to voice components of the calls 308A and 308C control group to determine which calls have voice components that are coherent with the voice components from the control group calls. As shown, call 308B is not coherent with the calls 308A and 308C. As shown, the call 308B may be placed by a vendor Merchant (e.g., on behalf of Mary 306). Accordingly, although the call 308B may originally be associated with Mary 306, based on the coherence check for Mary 306's expanded control group, call 308B may not be included in Mary 306's final expanded control group 318. Calls 308D, 308G, and 308H may pass the expanded group coherence check and, accordingly, may be in Mary 306's final expanded group.

At 214, a user may be enrolled in the highest initial security trust tier associated with any of the calls in the user's final expanded group. The initial highest security trust tier for a user may be the initial highest security trust tier that was used to group calls at 204 or may be a lower security trust tier (e.g., if no calls passed the coherence check at 208, and calls from a lower trust tier than the highest security trust tier were used to subsequently perform the grouping at 204 and coherence check at 208). As shown in FIG. 3A, Mary 306 may be enrolled in the high security trust tier based on calls 308A and 308C corresponding to the initial high security trust tier.

At 216, the historical calls in the final expanded group for a user may be associated with the user. The association at 216 may include linking voice calibration information extracted from the voice components of each of the historic calls in the final expanded group, with the user. For example, the pitch, pattern, frequency, phase, vocabulary, timings, and/or other properties extracted from the historical calls in the final expanded group may be stored in memory 140 and linked to the user their respective user. The voice calibration information extracted from these calls may be used to generate and/or update a user voice calibration profile such that future calls are compared to the user's voice calibration profile to determine if a given caller is the user. A larger number of calls may improve the voice calibration information and, thus, the voice calibration profile for a given user such that future calls can be better matched to the user's voice.

In the example of FIG. 3A, voice calibration information from calls 308A, 308C, 308D, 308G, and 308H may be linked to Mary 306 such that future calls from a user may be matched to Mary 306's voice calibration information to determine if the user on a given future call is Mary 306.

In the enrollment example of FIG. 3B, a different call history 320 for a first account 304 for Mary 306 and John 310 and a second account 312 for Mary 306, than the call history 302 in FIG. 3A, is provided. Call history 320 includes calls 328A having a high initial security trust tier for Mary 306, 328B having a low initial security trust tier for Mary 306, 328C having a medium initial security trust tier for Mary 306, 328D having a medium initial security trust tier for Mary 306, 328E having a low initial security trust tier for John 310, 328F having a medium initial security trust tier for Mary 306, and 328G having a low initial security trust tier for Mary 306.

In the example of FIG. 3B, the highest initial security trust tier call for Mary 306 may be call 328A (i.e., a high security trust tier). As there is only one call (i.e., 328A) that is in the highest initial security trust tier (i.e., the high security trust tier), the group and seeding step and the coherence step may not be performed. As a result of an expansion step, Mary 306's call 328B may be excluded as the voice attributes from the highest initial security trust tier call 328A may not match with the voice attributes of call 328B due to call 328B being from a merchant account. Additionally, the highest initial security trust tier call for John 310 may be call 328E (i.e., a low security trust tier). As there is only one call (i.e., 328E) that is in the highest initial security trust tier (i.e., the low security trust tier), the group and seeding step and the coherence step may not be performed.

Based on Mary 306's and John 310's call history 320, calls 328A, 328C, 328D, 328F, and 328G may be associated with Mary 306 and call 328E may be associated with John 310. As call 328A is in a high security trust tier, Mary 306 may be enrolled in the high security trust tier. As call 328E is in a low security trust tier, John 310 may be enrolled in the low security trust tier.

Figure 4:
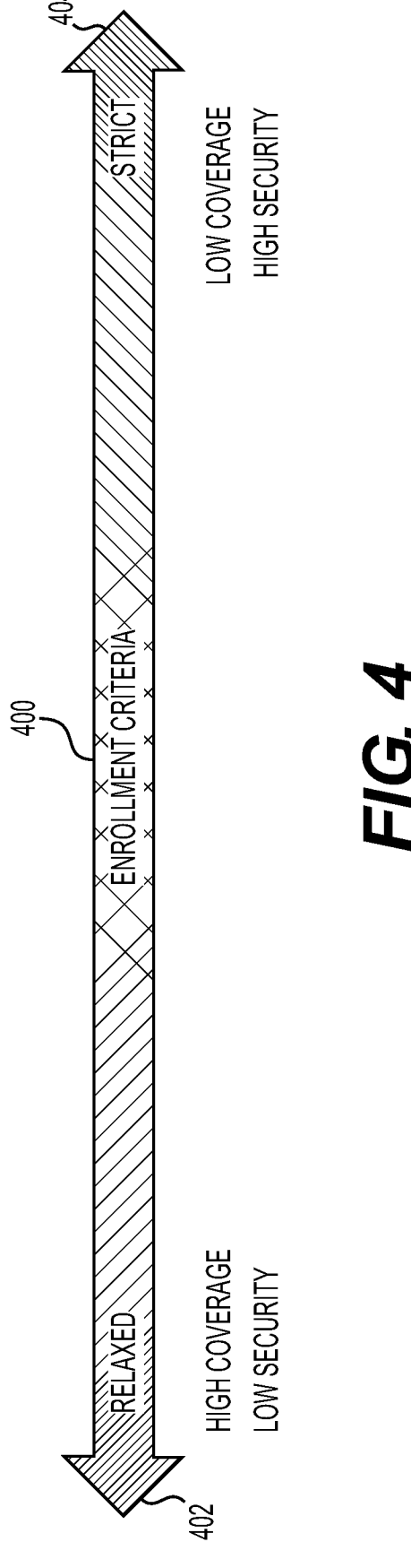
FIG. 4 depicts a sliding scale for enrollment criteria in view of coverage and security, according to one or more embodiments.

A given trust tier enrollment may affect the level of access for a given user. FIG. 4 depicts a sliding scale 400 for enrollment criteria in view of coverage and security. As shown, sliding scale includes a relaxed end 402 and a strict end 404. Relaxed end 402 corresponds to high coverage and low security and strict end 404 corresponds to low coverage and high security. An amount of coverage corresponds to ease of enrollment for one or more users. Accordingly, a high amount of coverage corresponds to a greater number of users enrolling at a given security level and a low amount of coverage corresponds to a lesser number of users enrolling at a given security level. For example, more users may be able to enroll in a lower security level associated with the relaxed end 402 in comparison to a number of users that enroll in a higher security level associated with the strict end 404. The relaxed end 402 may correspond to a lower level of access to functions when compared to the strict end 404 as the relaxed end 402 is associated with lower security and the strict end 404 is associated with higher security.

FIG. 5 depicts a flowchart for granting access in accordance with a security trust tier. At 502 of FIG. 5, a user may be enrolled in a first security tier, from a plurality of security tiers, based on user risk criteria and call risk criteria applied to one or more historical calls, e.g., as described in FIG. 2. At 214 of FIG. 2, a user may be enrolled in a security tier corresponding to a highest security trust tier associated with historical calls for the user. At 504 of FIG. 5, voice calibration information for the enrolled user (i.e., enrolled at 502 of FIG. 5) may be stored (e.g., at memory 140 of FIG. 1). As shown at 216 of FIG. 2, historical calls in an expanded group of calls may be associated with a user.

Voice calibration information extracted from the historical calls and stored at 504 of FIG. 5 may be voice calibration information is extracted from calls that are associated with a user via one or more of grouping, seeding, coherence check, expansion, and/or enrollment steps (e.g., as described in FIG. 2). Accordingly, voice calibration information stored during enrollment may be more reliable than voice calibration information that is extracted from one or more calls that have not gone through the enrollment process of FIG. 2. For example, if voice calibration information was extracted from call history 302 of FIG. 3A for Mary 306, the voice calibration information would include call 308B from Merchant which would result in unreliable voice calibration information.

At 506 of FIG. 5, calls may be monitored by a call monitoring component. The call monitoring component may be a network 110 component or may be part of authorization component 120. Calls received at one or more sites may be monitored for their voice components. For example, an entity may have a plurality of sites that receive calls from users associated with the entity. The sites may individually or via network 110 extract voice component information from calls received at the sites. The voice component information may be extracted, for example, after applying an analog to digital converter to audio components of each given call. The analog to digital converter fora given call may be implemented using a processor (e.g., processor 130 of FIG. 1). Each call that includes an audio component may be monitored by extracting voice components from the call.

Data associated with the extracted voice components may be provided to a machine learning model to be categorized. The machine learning model may be a part of the voice matching component 124. The data may be categorized to narrow the number of users that a given voice component may correspond to. According to an implementation, the machine learning model may match a voice component with a given user at 508, based on authenticating a given call as originating from an enrolled user (e.g., enrolled via the process of FIG. 2). According to another implementation, the machine learning model may reduce the number of possible users whose voice calibration data matches attributes of the voice components of a call. Voice matching component 124 may further match the voice components with a user whose voice calibration data matches attributes of the voice components, at 508. According to an implementation, a user or user device may provide identifying information which may be used to determine which one of one or more available enrolled voices are compared to an incoming voice.

The call monitoring may include determining that a call meets a minimum criteria. The minimum criteria may include certain call risk criteria, user risk criteria, and audio quality requirements such as, for example, the call being of adequate voice quality, the call having a limited number of callers or users, the calling being from a trusted device, or the like or a combination thereof. Calls that do not meet the minimum criteria may not be considered for matching to voice calibration information for enrolled users.

Upon matching voice components of a call to voice calibration data of an enrolled user, the security trust tier of the user may be identified. At 510, an enrolled user, whose call is authenticated as originating from the enrolled user, at 508, may be granted user account access in accordance with the security trust tier associated with the enrolled user. The account access may be granted during the call such that the user is able to have access to information, actions, events, etc. based on the security trust tier. The user access provided to the user may correspond to the security trust tier such that a lower security trust tier may correspond to a lower level of access and a higher security trust tier may correspond to a higher level of access, as further discussed herein.

At 512, voice calibration information associated with an enrolled user that is granted user access at 510 may be updated. The voice calibration information may be updated based on data extracted from the voice component associated with the call received at 506. According to an implementation, the call may be designated a historical call and the process of FIG. 2 to enroll a user may be updated using the call received at 504. The call received at 504 may be associated with the user at 216 of FIG. 2. Accordingly, voice calibration information that is associated with a user may improve with more calls that meet a coherence check with historical calls associated with the user.

Figure 6:
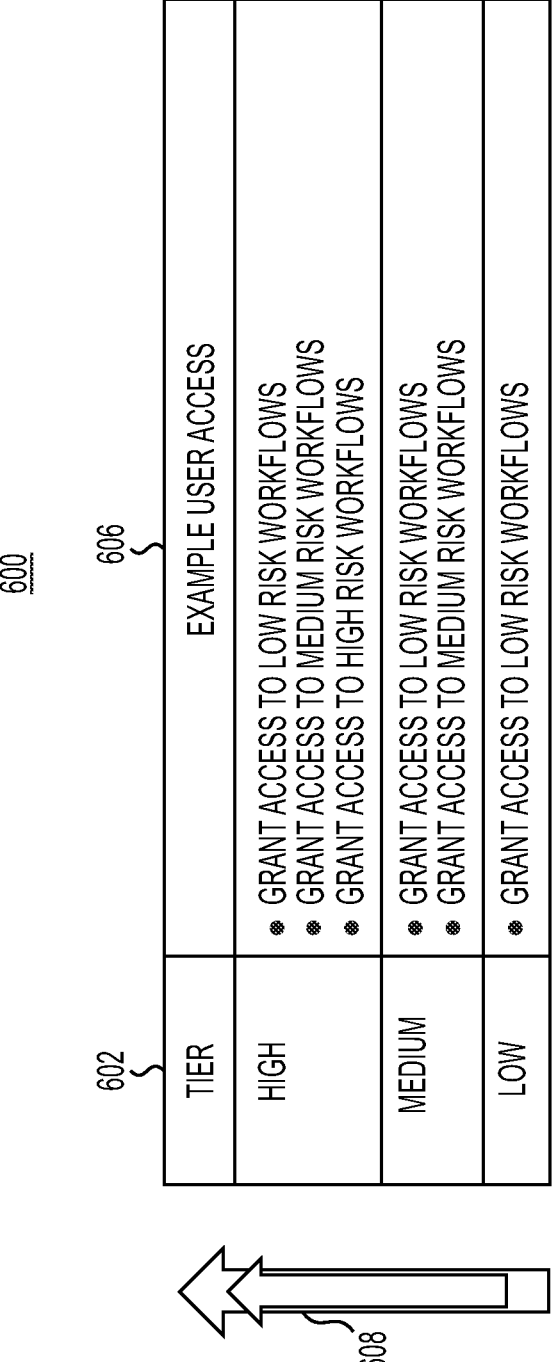
FIG. 6 depicts a chart for enrollment based authorization, according to an example of the present disclosure.

FIG. 6 depicts an example chart 600 for enrollment based authorization. It will be understood that example chart 600 is for illustration purposes only and that the tiers, enrollment equivalents, and user access disclosed herein is not limited to those provided in chart 600. As shown in chart 600, a user may be enrolled in a security trust tier 602. As indicated by arrow 608, in chart 600 the level of security for security trust tiers may increase for the security trust tiers in the direction of arrow 608.

Matching voice components of a call to voice calibration information of a user enrolled with a low security trust tier may be equivalent to verifying the identity of a user with public demographic information. For example, matching the voice component to the voice calibration information for a low security tier enrolled user may be considered the same as asking a user for the user's verifying information. The corresponding access 606 may be to initiate a call (e.g., with a call agent) based on the voice authentication. The access corresponding to the low security trust tier may be the lowest level of access affording the least amount of actions based on the access.

According to an implementation, if a level of access requested by a user (e.g., during a phone call) exceeds the level of access granted to the user based on the user's enrollment, additional authentication options may be provided to the user. The additional authentication options for user access requests exceeding enrollment access may include non-voice based options such as confirmation of user data, answers to security questions, answers to identity questions, or the like.

The systems and devices of the computing environment 100 corresponding to FIG. 1, may communicate in any arrangement. Any of the components of computing environment 100 may include a computer system such as, for example, a desktop computer, a mobile device, a tablet, a laptop, a haptic device, an oratory device, a wearable device such as a smart watch, smart glasses, servers, databases, cloud components or the like and may use one or more electronic application(s) (e.g., a program, plugin, etc.), installed on a memory of any of the components. In some embodiments, the electronic application(s) may be associated with one or more of the other components in the computing environment 100. For example, the electronic application(s) may include a portal for accessing and/or interacting with one or more of the other components in the computing environment.

In various embodiments, electronic network 110 may connect components of the computing environment 100. Electronic network 110 may be a wide area network ("WAN"), a local area network ("LAN"), personal area network ("PAN"), or the like. In some embodiments, the electronic network may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network may include or may be in communication with a telecommunications network, e.g., a cellular network.

Although the components shown in FIG. 1 are depicted as separate components, it should be understood that a component or portion of a component may, in some embodiments, be integrated with or incorporated into one or more other components. Further, it should be understood that data described as stored on a memory (e.g., memory 140) of a particular system or device in some embodiments, may be stored in another memory or distributed over a plurality of memories of one or more systems and/or devices in other embodiments.

In the implementations described herein, various acts are described as performed or executed by components from computing environment 100, of FIG. 1. However, it should be understood that in various implementations, various components of the computing environment 100 discussed above may execute instructions or perform acts including the acts discussed herein. Further, it should be understood that in various implementations, one or more steps may be added, omitted, and/or rearranged in any suitable manner.

Figure 7:
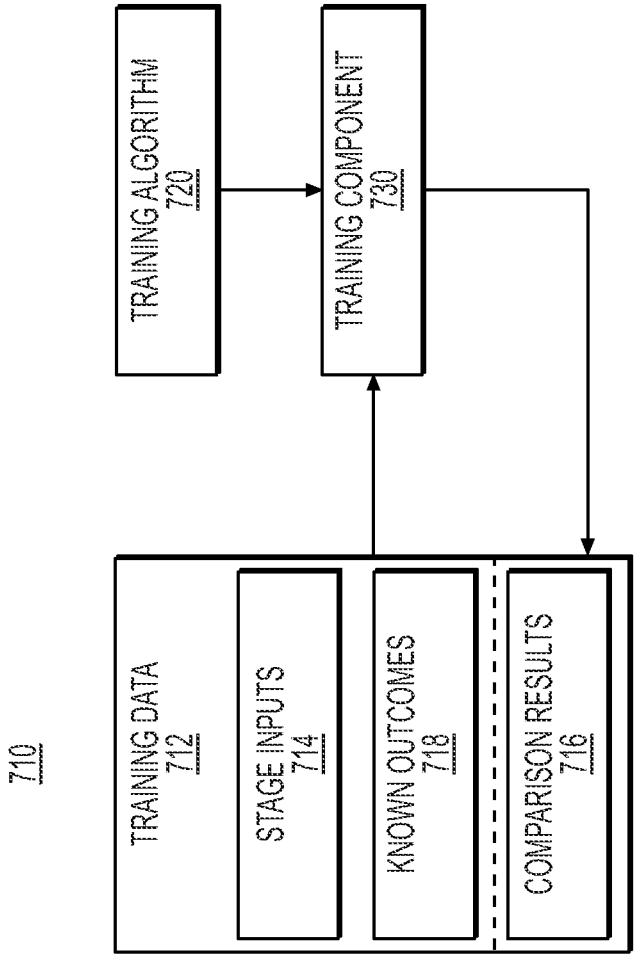
FIG. 7 depicts a data flow for training a machine learning model, according to one or more embodiments.

One or more implementations disclosed herein include a machine learning model. A machine learning model disclosed herein may be trained using the data flow 710 of FIG. 7. As shown in FIG. 7, training data 712 may include one or more of stage inputs 714 and known outcomes 718 related to a machine learning model to be trained. The stage inputs 714 may be from any applicable source including voice components, user 102 data, enrollment data, voice matching data, access data, stage outputs (e.g., one or more outputs from a step from flowchart 200 of FIG. 2 or flowchart 500 of FIG. 5). The known outcomes 718 may be included for machine learning models generated based on supervised or semi-supervised training. An unsupervised machine learning model may not be trained using known outcomes 718. Known outcomes 718 may include known or desired outputs for future inputs similar to or in the same category as stage inputs 714 that do not have corresponding known outputs.

The training data 712 and a training algorithm 720 may be provided to a training component 730 that may apply the training data 712 to the training algorithm 720 to generate a machine learning model. According to an implementation, the training component 730 may be provided comparison results 716 that compare a previous output of the corresponding machine learning model to apply the previous result to re-train the machine learning model. The comparison results 716 may be used by the training component 730 to update the corresponding machine learning model. The training algorithm 720 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

In general, any process or operation discussed in this disclosure that is understood to be computer-implementable, such as the process illustrated in FIGS. 2, and 5, may be performed by one or more processors of a computer system, such any of the systems or devices in the computing environment of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in of FIG. 1. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 8:
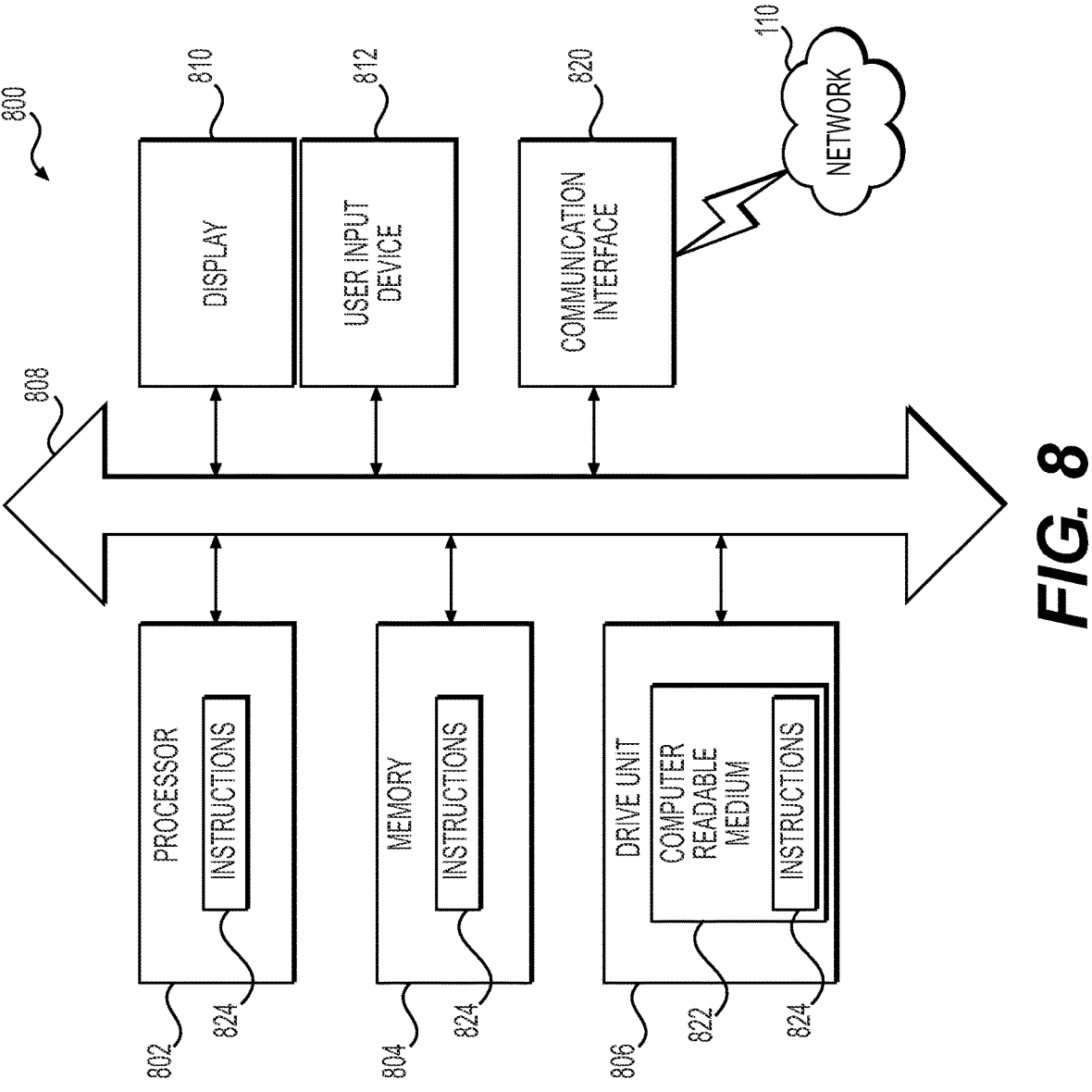
FIG. 8 depicts an example of a computing device, according to one or more embodiments.

FIG. 8 is a simplified functional block diagram of a computer system 800 that may be configured as a device for executing the processes of FIG. 1, according to exemplary embodiments of the present disclosure. FIG. 8 is a simplified functional block diagram of a computer system that may generate interfaces and/or another system according to exemplary embodiments of the present disclosure. In various embodiments, any of the systems (e.g., computer system 800) herein may be an assembly of hardware including, for example, a data communication interface 820 for packet data communication. The computer system 800 also may include a central processing unit ("CPU") 802, in the form of one or more processors, for executing program instructions. The computer system 800 may include an internal communication bus 808, and a storage unit 806 (such as ROM, HDD, SDD, etc.) that may store data on a computer readable medium 822, although the computer system 800 may receive programming and data via network communications. The computer system 800 may also have a memory 804 (such as RAM) storing instructions 824 for executing techniques presented herein, although the instructions 824 may be stored temporarily or permanently within other modules of computer system 800 (e.g., processor 802 and/or computer readable medium 822). The computer system 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for voice verification based security tier designation, the method comprising:

enrolling a user at a first security tier, from a plurality of security tiers, based on user risk criteria and call risk criteria applied to a plurality of historical calls, and based on coding a pointer of the first security tier to a file associated with the user, wherein the plurality of historical calls used for the enrollment includes at least one historical call placed by an account manager to a call center on behalf of the user, wherein an account associated with the user was opened based on the at least one historical call that was placed by the account manager and that was used for the enrollment, and wherein enrolling the user at the first security tier comprises:

determining an initial security trust tier for each of the plurality of historical calls, the initial security trust tier being determined, in each case, from at least a highest security trust tier and one or more secondary security trust tiers, and the plurality of historical calls being associated with the user;

grouping, in a first group, one or more of the plurality of historical calls that are determined to be in the highest security trust tier relative to each of the one or more secondary security trust tiers for each of the plurality of historical calls, wherein multiple historical calls of the plurality of historical calls are in the first group;

performing a coherence check to determine that each of the multiple historical calls in the first group have individual voice components that are coherent with each other;

maintaining a first set of historical calls of the multiple historical calls that pass the coherence check in the first group and excluding a second set of historical calls of the multiple historical calls that do not pass the coherence check from the first group;

expanding the first group to an expanded first group by including at least one historical call of the plurality of historical calls that is not in the first group and that has individual voice components that are coherent with at least one historical call of the first set of historical calls in the first group;

enrolling the user in the first security tier, the first security tier corresponding to the highest security trust tier; and associating the historical calls in the expanded first group with the user;

storing voice calibration information for the enrolled user based on the plurality of historical calls used for the enrollment, the plurality of historical calls used for the enrollment including the at least one historical call placed by the account manager;

monitoring for a call and receiving data associated with the call, the data having a voice component captured using a microphone;

authenticating the call as originating from the enrolled user by matching the voice component to the voice calibration information;

granting the enrolled user account access in accordance with the first security tier, during the call, based on the enrolling the user at the first security tier and the authenticating the call as originating from the enrolled user; and updating the voice calibration information based on the voice component.

2. The method of claim 1, wherein at least one of the user risk criteria or the call risk criteria is independent of historical voice calibration information.

3. The method of claim 1, wherein the historical calls associated with the user in the expanded first group correspond to two or more user accounts.

4. The method of claim 3, wherein one or more users are associated with each of the two or more user accounts.

5. The method of claim 1, wherein the initial security trust tier is based on the user risk criteria.

6. The method of claim 1, wherein the initial security trust tier is based on the call risk criteria.

7. The method of claim 1, further comprising updating the enrolled user's security tier from the first security tier to a second security tier based on at least one of an updated user risk criteria or an updated call risk criteria.

8. The method of claim 1, wherein each of the plurality of historical calls meets an audio quality requirement.

9. The method of claim 1, wherein the voice calibration information includes at least minimum duration of voice data.

10. The method of claim 1, further comprising:

receiving a user request exceeding the account access allowed via the first security tier; and providing additional authentication options based on the user request exceeding the account access allowed via the first security tier.

11. A method for enrolling a user in a security tier, the method comprising:

determining an initial security trust tier for each of a plurality of historical calls associated with the user, the initial security trust tier being determined, in each case, from at least a highest security trust tier and one or more secondary security trust tiers, and the plurality of historical calls being associated with the user, wherein the plurality of historical calls used for the determining includes at least one historical call placed by an account manager to a call center on behalf of the user, wherein an account associated with the user was opened based on the at least one historical call that was placed by the account manager and that was used for the determining;

grouping, in a first group, one or more of the plurality of historical calls that are determined to be in the highest security trust tier relative to the one or more secondary security trust tiers for each of the plurality of historical calls, wherein multiple historical calls of the plurality of historical calls are in the first group;

performing a coherence check to determine that each of the multiple historical calls in the first group has individual voice components that are coherent with each other;

maintaining a first set of historical calls of the multiple historical calls that pass the coherence check in the first group and excluding a second set of historical calls of the multiple historical calls that do not pass the coherence check from the first group;

expanding the first group to an expanded first group by including at least one of the plurality of historical calls that are not in the first group and that have individual voice components that are coherent with at least one historical call of the first set of historical calls in the first group;

enrolling the user in the first security tier based on coding a pointer of the first security tier to a file associated with the user, the first security tier corresponding to the highest security trust tier; and associating the historical calls in the expanded first group with the user.

12. The method of claim 11, wherein the historical calls associated with the user in the expanded first group correspond to two or more user accounts.

13. The method of claim 11, wherein the initial security trust tier is based on a user risk criteria.

14. The method of claim 11, wherein the initial security trust tier is based on a call risk criteria.

15. The method of claim 11, further comprising:

determining a subsequent security trust tier for at least one subsequent call; and updating the first group based on determining the subsequent security trust tier.

16. The method of claim 11, wherein performing the coherence check comprises determining that each of the multiple historical calls in the first group has individual voice components that meet a coherence threshold in comparison to each other.

17. The method of claim 11, wherein expanding the first group to an expanded first group comprises including at least one of the plurality of historical calls that are not in the first group that meet a coherence threshold in comparison with at least one historical call in the first set of historical calls.

18. The method of claim 11, further comprising:

storing voice calibration information for the enrolled user;

receiving a call having a voice component captured using a microphone;

authenticating the call as originating from the enrolled user by matching the voice component to the voice calibration information;

granting the enrolled user account access in accordance with the first security tier, during the call, based on the enrolling the user at the first security tier and the authenticating the call as originating from the enrolled user; and updating the voice calibration information based on the voice component.

19. A system comprising:

a data storage device storing processor-readable instructions; and a processor operatively connected to the data storage device and configured to execute the instructions to perform operations that include:

determining an initial security trust tier for each of a plurality of historical calls, the initial security trust tier being determined, in each case, from at least a highest security trust tier and one or more secondary security trust tiers, wherein the plurality of historical calls used for the determining is associated with a user and includes at least one historical call placed by an account manager to a call center on behalf of the user, wherein an account associated with the user was opened based on the at least one historical call that was placed by the account manager and used for the determining;

grouping, in a first group, one or more of the plurality of historical calls that are determined to be in the highest security trust tier relative to each of the one or more secondary security trust tiers for each of the plurality of historical calls, wherein whether multiple historical calls of the plurality of historical calls are in the first group;

performing a coherence check to determine that each of the multiple historical calls in the first group have individual voice components that are coherent with each other;

maintaining a first set of historical calls of the multiple historical calls that pass the coherence check in the first group and excluding a second set of historical calls of the multiple historical calls that do not pass the coherence check from the first group;

expanding the first group to an expanded first group by including at least one historical call of the plurality of historical calls that are not in the first group and that have individual voice components that are coherent with at least one historical call of the first set of historical calls in the first group;

associating the historical calls in the expanded first group with the user;

enrolling the user at a first security tier, from a plurality of security tiers, based on user risk criteria and call risk criteria applied to the plurality of historical calls, and based on coding a pointer of the first security tier to a file associated with the user, the first security tier corresponding to the highest security trust tier;

storing voice calibration information for the enrolled user based on the plurality of historical calls;

monitoring for a call and receiving data associated with the call, the data having a voice component captured using a microphone;

authenticating the call as originating from the enrolled user by matching the voice component to the voice calibration information;

granting the enrolled user account access in accordance with the first security tier, during the call, based on the enrolling the user at the first security tier and the authenticating the call as originating from the enrolled user; and updating the voice calibration information based on the voice component.

20. The system of claim 19, wherein at least one of the user risk criteria or the call risk criteria is independent of historical voice calibration information.

* * * * *